United States Patent [19]

Nebelung

[11] Patent Number: 4,588,068
[45] Date of Patent: May 13, 1986

[54] PARISON TRANSFERRING MEANS

[75] Inventor: Hermann H. Nebelung, Zurich, Switzerland

[73] Assignee: Emhart Industries, Inc., Farmington, Conn.

[21] Appl. No.: 610,054

[22] Filed: May 14, 1984

[30] Foreign Application Priority Data

May 21, 1983 [GB] United Kingdom ............ 8314143

[51] Int. Cl.⁴ .............................................. B65G 47/24
[52] U.S. Cl. ...................... 198/403; 65/260; 294/88; 294/119.1; 198/468.2
[58] Field of Search .................... 414/741; 65/260; 198/486, 403, 375, 377, 378, 379, 468.2; 294/88 X, 119.1 X

[56] References Cited

U.S. PATENT DOCUMENTS 1,858,642  5/1932  Ross ..................................... 65/260
2,697,529 12/1954  Hubbell et al. ..................... 414/741
3,314,554  4/1967  Cuniberti ............................ 198/403
3,406,836 10/1968  Manetta et al. .................... 414/741

Primary Examiner—Joseph E. Valenza
Assistant Examiner—D. Glenn Dayoan
Attorney, Agent, or Firm—H. Samuel Kieser

[57] ABSTRACT

A parison transferring device for use in transferring glass parisons from a parison forming mold to a blow mold. The device comprises gripping members operable to grip or release a parison. The gripping members are movable about a horizontal axis between a gripping position and a releasing position. A cylinder is mounted on a horizontal shaft and has the gripping members mounted thereon. A piston is movable in the cylinder and is screw-threadedly connected to the shaft so that movement along the cylinder causes the piston to rotate about the horizonal axis. A driving connection between the piston and cylinder causes the cylinder to rotate when the piston does so.

6 Claims, 3 Drawing Figures

PARISON TRANSFERRING MEANS

BACKGROUND OF THE INVENTION

This invention is concerned with parison transferring means for use in transferring glass parisons from a parison forming mould of a glassware container manufacturing machine to a further mould of the machine in which the parison is formed into a container.

Glassware container manufacturing machines of the so-called "individual section" type are equipped with parison transferring means which operates after a parison has been formed in a parison forming mould, by either a pressing or a blowing process from a gob of molten glass, to transfer the parison to a further mould in which the parison is blown into the shape of a container. The transferring means comprises jaws which form gripping means for gripping a parison and holding it while the jaws are moved about a horizontal axis of rotation to move them from a gripping position to a releasing position when the parison is in the further mould. The jaws are moved through approximately 180° in this movement about the axis of rotation so that the parison is inverted during the movement. Conventional moving means for moving the jaws about the axis of rotation comprises a vertically-extending piston and cylinder assembly arranged to move a piston rod thereof in a vertical direction. The piston rod is attached to a rack which is meshed with a gear which is mounted for rotation about the axis of rotation. The jaws are mounted on carriers secured to the gear so that operation of the piston and cylinder assembly moves the rack which causes the gear and the jaws to rotate about the axis of rotation.

In glassware container manufacturing machines of the individual section type, space is very much at a premium and the above-described conventional parison transferring means is bulky involving as it does a vertically-extending piston and cylinder assembly with rack as well as items arranged along the axis of rotation.

It is an object of the present invention to provide a parison transferring means which is less bulky than the above-described parison transferring means.

BRIEF SUMMARY OF THE INVENTION

The invention provides parison transferring means for use in transferring glass parisons from a parison forming mould of a glassware container manufacturing machine to a further mould of the machine in which the parison is formed into a container, the transferring means comprising gripping means operative to grip a parison at a gripping position of the gripping means and to release the parison at a releasing position of the gripping means, and moving means operative to move the gripping means between its gripping and releasing positions by moving the gripping means about a horizontal axis of rotation, the moving means comprising a fixedly mounted shaft extending along the axis of rotation, a cylinder mounted on an end portion of the shaft for rotation about said axis, the gripping means being mounted on said cylinder, a piston movable in said cylinder by fluid under pressure introduced into the cylinder, the piston being connected to the cylinder by a driving connection which causes rotation of the cylinder about said axis when the piston rotates about said axis and a piston rod fixed to said piston, there being a screw-threaded connection between the piston rod and the shaft such that, when the piston moves in the cylinder, the screw-threaded connection causes the piston to rotate about said axis thereby causing the cylinder and the gripping means to rotate about said axis.

A parison transferring means as described in the last preceding paragraph does not comprise a vertically extending piston and cylinder assembly and hence is less bulky than conventional parison transferring means. Furthermore, the lack of a vertically extending piston and cylinder assembly allows the space normally occupied by such an assembly to be occupied by a cullet chute into which defective or not required parisons can be dropped by opening the jaws in an intermediate position of the gripping means between the gripping position and the releasing position.

Preferably in parison transferring means as described in the last preceding paragraph but one, the cylinder is integral with a further cylinder mounted for rotation about said axis on an end portion of a further fixedly mounted shaft aligned with the aforementioned shaft, there being a further piston movable in said further cylinder by fluid under pressure introduced into said further cylinder, the further piston being connected to the further cylinder by a driving connection which causes rotation of the further cylinder about said axis when the further piston rotates about said axis, and a further piston rod fixed to the further piston, there being a screw-threaded connection between the further piston rod and the further shaft such that, when the further piston moves in the further cylinder, the screw-threaded connection causes the further piston to rotate about said axis thereby causing the further cylinder to rotate about said axis.

In order to further reduce the bulk of the parison transferring means by reducing the length of the movement of the or each piston, preferably the or each driving connection is a screw-threaded connection of opposite hand to the screw-threaded connection between the piston rod and the shaft.

So that inlets/outlets for fluid under pressure are protected from hot glass, preferably inlets/outlets for fluid under pressure to said cylinder, each extend through said shaft to an annular space formed between the cylinder and the shaft from which the inlet/outlet extends within the wall of the cylinder.

In order to reduce the risk of damage to the parison transferring means during operation, preferably the or each cylinder is provided with ports arranged to be closed by the piston as it approaches the end of its stroke so that the end portion of the movement of the piston is cushioned.

BRIEF DESCRIPTION OF THE DRAWINGS

There now follows a detailed description, to be read with reference to the accompanying drawings, of parison transferring means which is illustrative of the invention. It is to be understood that the illustrative parison transferring means has been selected for description by way of example and not of limitation of the invention.

DETAILED DESCRIPTION OF PREFERRED EMBODIMENT OF THE INVENTION

Figure 1:
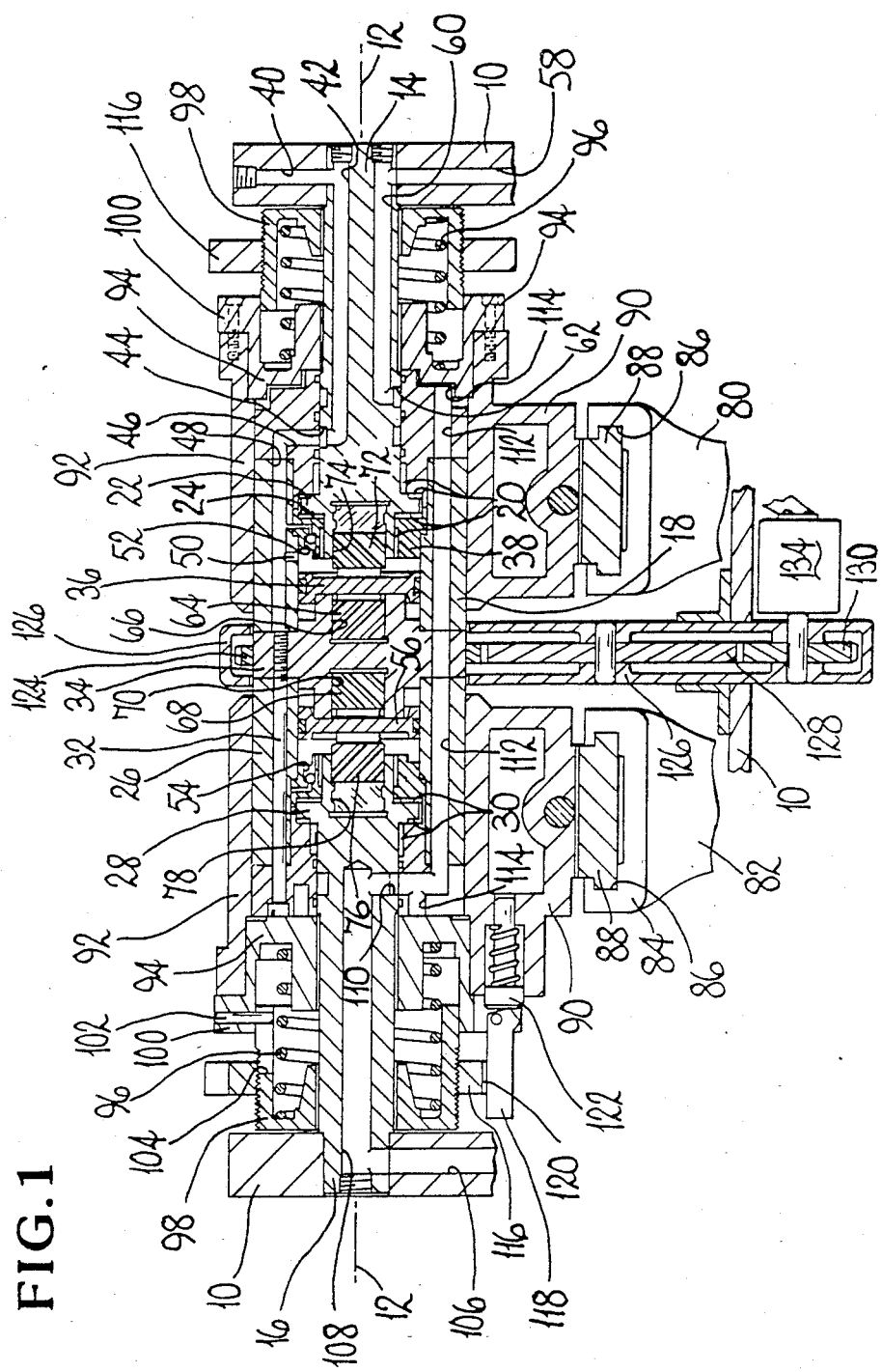
FIG. 1 is a horizontal cross-sectional view through the illustrative parison transferring means with the gripping means positioned at its gripping position at the parison forming mold and with the gripping means in their operative position.

The illustrative parison transferring means is for use in an individual section type glassware manufacturing machine for transferring glass parisons from a parison forming mould of the machine to a further mould of the machine in which the parison is formed into a container by a blowing process. The illustrative transferring means is mounted on a frame 10 of the machine between the parison forming mould (not shown) and the further mould (not shown) of the machine.

The illustrative transferring means comprises gripping means (to be described) operative to grip a parison at a gripping position of the gripping means, when the parison is in the parison forming mould, and to release the parison at a releasing position of the gripping means, when the parison is in said further mould of the machine. The illustrative transferring means also comprises moving means operative to move the gripping means between its gripping and releasing positions by moving the gripping means about a horizontal axis of rotation 12.

The moving means of the illustrative transferring means comprises a shaft 14 fixedly mounted on the frame 10 and extending along the axis of rotation 12 and a further shaft 16 also fixedly mounted on the frame 10 and extending along the axis 12 in alignment with the shaft 14. A cylinder 18 of the moving means is mounted on an end portion of the shaft 14 for rotation about the axis 12 on bearings 20 around the shaft 14 and, in particular, around a flange 22 formed on the shaft 14. The flange 22 is received in a recess 24 in the cylinder 18 so that the cylinder 18 cannot move along the axis 12. A further cylinder 26 similar to the cylinder 18 is mounted in identical fashion on an end portion of the shaft 16 having associated therewith a flange 28 on the shaft 16 and bearings 30 similar respectively to the flange 22 and the bearings 20. The cylinders 18 and 26 are integral with one another as they are both bolted by bolts 32 (one only shown in the drawings) to a hub member 34 which is located between the end portions of the shafts 14 and 16.

A piston 36 is movable in the cylinder 18 between stops provided by the hub member 34 and an internal flange member 38 of the cylinder 18. The piston 36 is movable in the cylinder 18 by fluid under pressure introduced into the cylinder 18 through two inlet/outlets thereof. A first of the inlet/outlets comprises a passage 40 extending downwardly through the frame 10, a horizontal passage 42 formed in the shaft 14 and communicating with the passage 40, an annular space 44 formed between the shaft 14 and the cylinder 18 communicating with the passage 42, a radial passage 46 formed in the cylinder 18 and communicating with the annular space 44, a horizontal passage 48 formed in the cylinder 18 and communicating with the passage 46, and two longitudinally-spaced ports 50 and 52 into the interior of the cylinder 18 to the right (viewing FIG. 1) of the piston 36. The port 50 enters the interior of the cylinder 18 radially and is arranged to be closed by the piston 36 as it is moved to the right. The port 52 enters the interior of the cylinder axially through the flange member 38 and contains a ball valve which prevents fluid from leaving the cylinder 18 through the port 52. Although not shown in the drawing, the passage 48 passes through the hub member 34 and into the cylinder 26. The passage 48 also communicates with two longitudinally-spaced ports into the interior of the cylinder 26, a port (not shown) similar to the port 50 and a port 54 similar to the port 52, these ports being to the left of a piston 56 movable in the cylinder 26. A second of the inlet/outlets comprises a passage 58 extending upwardly through the frame 10, a horizontal passage 60 formed in the shaft 14 and communicating with the passage 58, an annular space 62 formed between the shaft 14 and the cylinder 18 communicating with the passage 60, and further passages (not shown) similar to the passages 46 and 48 which communicate between the space 62 and ports into the interiors of the cylinders 18 and 26 to the left of the piston 36 and to the right of the piston 56. The ports communicating with the passage 40 comprise ports similar to the ports 50 and 52 for each cylinder 18 and 26, one port similar to the port 52 entering the cylinder 18 or 26 from the hub member 34 and one entering radially so that it is progressively closed as the piston 18 or 26 approaches the hub member 34. The arrangement is such that, when hydraulic fluid under pressure is introduced into the passage 40, the piston 36 is moved to the left and the piston 56 is moved to the right whereas, when fluid under pressure is introduced into the passage 58, the piston 36 is moved to the right and the piston 56 is moved to the left.

The piston 36 is connected to the cylinder 18 by a driving connection which causes rotation of the cylinder 18 about the axis 12 when the piston 36 rotates about said axis. The driving connection comprises a piston rod 64 integral with the piston 36 and formed with an external right-handed screw-thread which is threadedly-received in an internally screw-threaded recess 66 in the hub member 34. The arrangement is such that, when the piston 36 rotates about the axis 12, the screw-threaded driving connection causes the hub member 34 to rotate twice as fast about the axis 12 as the piston 36 and, as the cylinders 18 and 26 are bolted to the hub member 34, the cylinders 18 and 26 also rotate about the axis 12. A similar driving connection exists between the piston 56 and the cylinder 26; this driving connection comprises a piston rod 68 formed with an external left-handed screw-thread which is threadedly-received in an internally screw-threaded recess 70 in the hub member 34 so that rotation of the piston 56 also causes the cylinders 18 and 26 to rotate.

The piston 36 also has a piston rod 72 integral therewith and extending in the opposite direction to the piston rod 64. The piston rod 72 is formed with an external left-handed screw-thread which is threadedly-received in an internally screw-threaded recess 74 in the end of the shaft 14. There is thus a screw-threaded connection between the piston rod 72 and the shaft 14 such that, when the piston 36 moves in the cylinder 18, the screw-threaded connection causes the piston 36 to rotate about the axis 12 thereby causing the cylinder 18 to rotate also because of the aforementioned driving connection. The piston 56 also has a piston rod 76 similar to the piston rod 72 which is formed with an external right-handed screw-thread which is threadedly-received in an internally screw-threaded recess 78 in the end of the shaft 16. Thus, when the further piston 56 moves in the cylinder 26, the screw-threaded connection causes it to rotate about the axis 12 thereby causing the cylinder 26 to rotate.

In the operation of the moving means of the illustrative transferring means, when fluid under pressure is introduced into the passage 58, the piston 36 moves in the cylinder 18 from the position shown in the drawing to the right. As the piston 36 moves it is caused to rotate about the axis 12 by the screw-threaded connection between the piston rod 72 and the shaft 14. As the piston 36 rotates it causes the hub member 34 and the cylinders 18 and 26 to rotate about the axis 12 twice as fast as the piston 36 rotates because of the driving connection between the piston rod 64 and the hub member 34. While the piston 36 is moving along the cylinder 18, the piston 56 makes an equal movement but to the left in the cylinder 26 and is caused to rotate about the axis 12 by the connection between the piston rod 76 and the shaft 16. The rotation of the piston 56 causes the cylinder 26 to be rotated about the axis 12 as explained above. Thus, the two pistons 36 and 56 cooperate in rotating the cylinders 18 and 26 about the axis 12. When the piston 36 nears the end of its stroke, it progressively closes the port 50 so that the fluid leaving the cylinder 18 meets progressively increasing resistance and the end of the stroke of the piston 36 is cushioned. At this time, the aforementioned port in the cylinder 26 cushions the end of the stroke of the piston 56. This movement of the pistons 36 and 56 brings the gripping means to its releasing position shown in FIG. 2.

Figure 2:
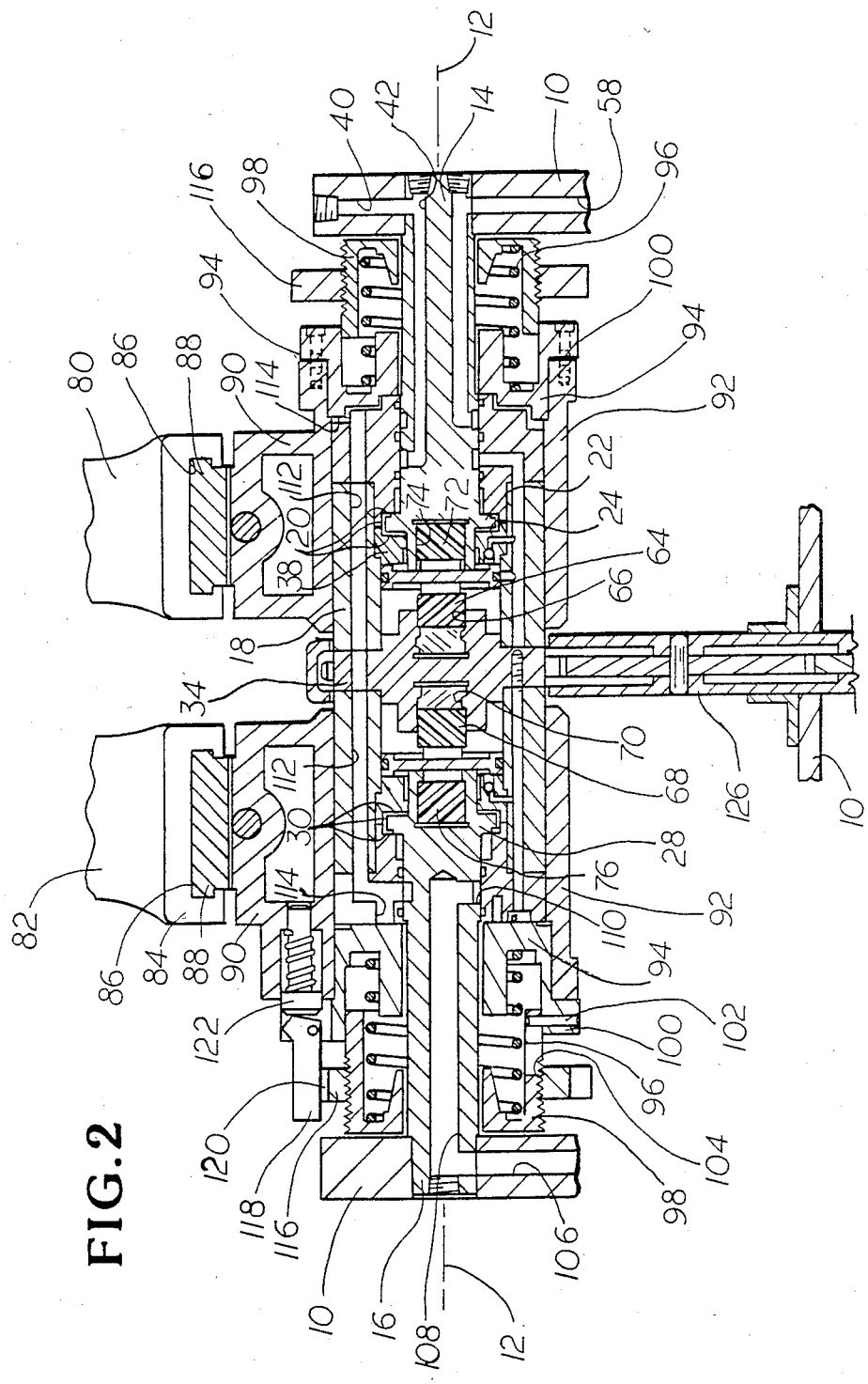
FIG. 2 is a horizontal cross-sectional view through the illustrative parison transferring means with the gripping means rotated from its position in FIG. 1 to its releasing position at the further mold.

When the gripping means is to be moved to its gripping position shown in FIG. 1 from its releasing position shown in FIG. 2, fluid under pressure is introduced into the passage 40. This causes the piston 36 to move to the left and the piston 56 to move to the right. As the pistons 36 and 56 move they rotate about the axis 12 in the opposite direction to their previous rotation and cause the cylinders 18 and 26 to rotate also in the opposite direction to their previous rotation. Again the end portions of the motions of the pistons 36 and 56 are cushioned by progressive closing of ports.

The gripping means of the illustrative transferring means will now be described. The gripping means comprises two jaws 80 and 82 which are arranged to cooperate in gripping a parison. In the drawings, only an end portion adjacent the shafts 14 and 16 of each jaw 80 and 82 is shown but the jaws 80 and 82 project radially of the axis 12 and have parison gripping surfaces (not shown) which co-operate to grip parisons, a parison gripping surface of the jaw 80 engages one side of a neck portion of a parison while a parison gripping surface of the jaw 82 engages the other side thereof. In FIG. 1, the jaws 80 and 82 are shown in an operative position thereof in which they grip a parison in a parison-forming mould. In this position, the jaws 80 and 82 project horizontally from the axis 12 (downwards viewing the drawing) and are turned about the axis 12 through 180° until they again project horizontally and the parison gripped thereby is in a blow mould of the machine. The jaws 80 and 82 then move to an inoperative position shown in FIG. 3 by moving directly away from one another and in doing so release a parison. The jaws 80 and 82 are then turned through 180° in the opposite direction and moved together to return to the condition shown in FIG. 1. The jaw 82 and parts associated therewith are mirror images of the jaw 80 and parts associated therewith, jaw 80 being mounted on the cylinder 26 and the jaw 82 on the cylinder 18, and parts associated with the jaw 82 are given identical reference numbers to the parts associated with the jaw 80 and are not further described hereinafter.

The jaw 80 is mounted on an arm 84 which defines a T-shaped slot 86 into which is received a complementary-shaped projection 88 of a bracket 90 which extends radially from a cylinder 92. The cylinder 92 is received over the cylinder 26 and has internal longitudinally extending splines (not shown) which are received in longitudinally extending grooves (not shown) in the external surface of the cylinder 26 so that the cylinder 92 can slide along the cylinder 26 but, when the cylinder 26 rotates about the axis 12, the cylinder 92 is also caused to rotate. Thus, when the cylinders 18 and 26 rotate about the axis 12, the cylinders 92 also rotate and carry the jaws 80 and 82 between their gripping and releasing positions.

At the end portions thereof nearest to the frame 10, the cylinder 92 extends beyond the cylinder 26 and contains a piston 94. The piston 94 is a sliding fit on the shaft 16 and is urged towards the cylinder 26 by a spring 96. The spring 96 also acts on an end cap 98 which is also a sliding fit on the shaft 16. The piston 94 has an external flange 100 which abuts the end of the cylinder 92 and is bolted thereto. A pin 102 mounted on the flange 100 projects into a longitudinal slot 104 formed in the end cap 98. When the jaws 80 and 82 are in their operative position (shown in FIG. 1), the spring 96 urges the end cap 98 towards the frame 10 but its movement is limited by the pin 102 engaging the end of the slot 104. The spring 96 also urges the piston 94 and therefore the cylinder 92 away from the frame 10 to a limit set by engagement of the piston 94 with the cylinder 26. Thus, the spring 96 acts to urge the jaw 80 towards the jaw 82 providing gripping force to grip a parison.

Figure 3:
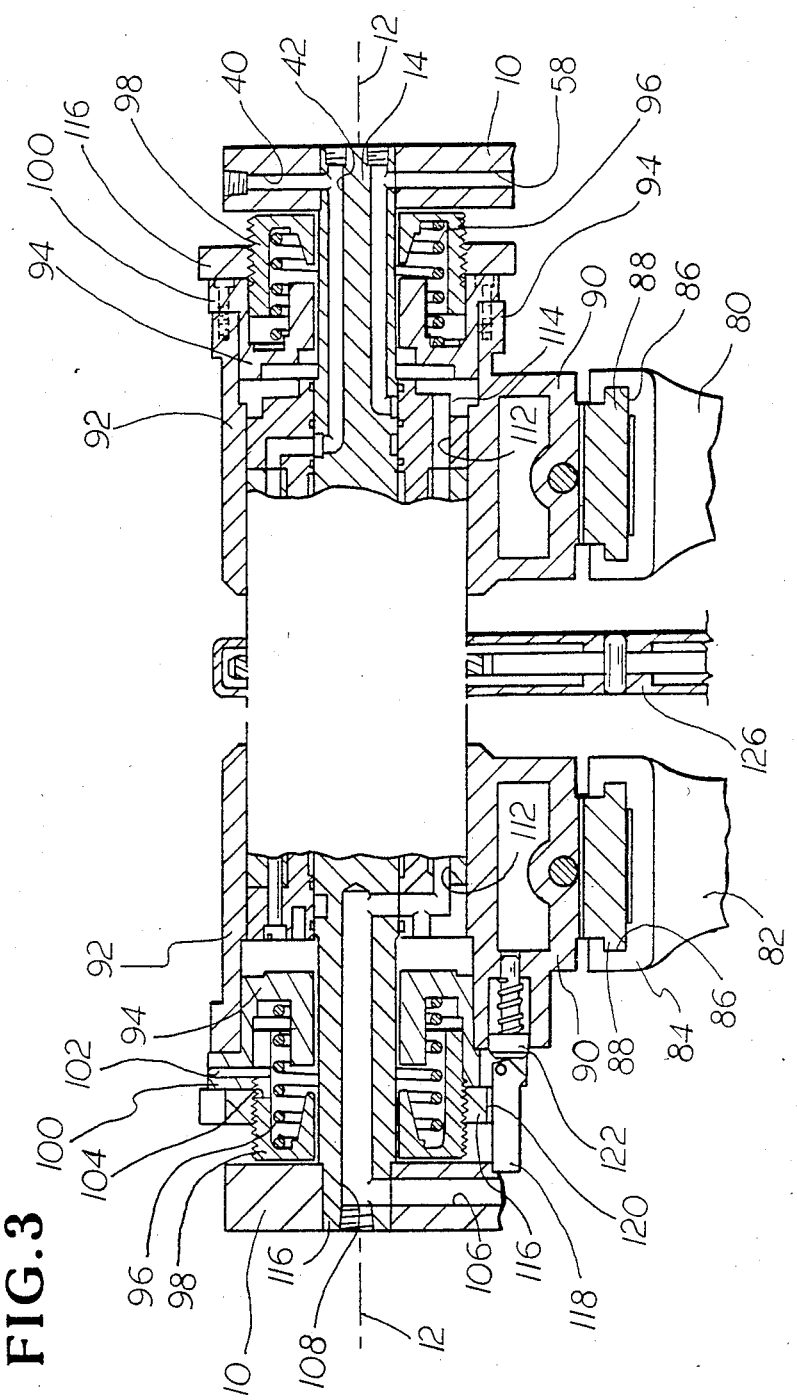
FIG. 3 is a cross-sectional view similar to FIG. 1, but showing the gripping means in its inoperative position.

In order to move the jaw 80 to its inoperative position as shown in FIG. 3, air under pressure is introduced into a passage 106 in the frame 10. The passage 106 communicates with a passage 108 extending horizontally within the shaft 16. It should be noted that the passage 108 is in the shaft 16 alone and the passages 42 and 60 are in the shaft 14 alone. The passage 108 communicates with an annular space 110 formed between the shaft 16 and the cylinder 26. The annular space 110 communicates with a passage 112 which extends in the cylinders 26 and 18 passing through the hub member 34. The passage 112 communicates through ports 114 with the spaces between the cylinder 26 and the piston 94 and between the cylinder 18 and its associated piston 94. Thus, the introduction of air under pressure into the passage 106 causes the pistons 94 to move away from the respective associated cylinders 26 and 18 compressing the springs 96.

As the piston 94 moves away from its associated cylinder 18, it carries the cylinder 92 with it and therefore moves the jaw 80 away from the jaw 82. This movement causes the pin 102 to move along the slot 104 until the flange 100 engages a locking nut 116 threadedly-received on a screw-threaded portion of the end cap 98. The locking nut 116 is held against rotation on the end cap 98 by a latch 118 pivotally mounted on the bracket 90. The latch 118 enters a slot 120 in the nut 116 and is held against rotation about its pivot point by a spring-loaded plunger 122 mounted on the bracket 90. If it is desired to adjust the position of the nut 116, the latch 118 can be pivoted out of the slot 120 against the action of the plunger 122 to allow the nut 116 to be rotated. It should be noted that, in the interests of clarity, the parts 102, 104, 118, 120 and 122 associated with the jaw 82 are not shown in the drawing.

The illustrative parison transferring means also comprises control means (not shown) operable to control supply of hydraulic fluid under pressure to the cylinders 18 and 26. The control means comprises a servo-operated valve by operation of which the jaws 80 and 82 can be turned about the axis 12 when required in the operation of the machine and with a desired position against time profile. In order to increase the accuracy of the motion, the illustrative transferring means comprises a feedback device driven by rotation of the cylinders 18 and 26 and arranged to provide feedback of the position of the cylinders 18 and 26 about the axis 12. The feedback device comprises a cylindrical gear 124 which is fixed to the hub member 34 for rotation therewith. The gear 124 is within a housing 126 which is mounted on the frame 10 and extends around the hub member 34. The housing 126 supports a gear 128 which meshes with the gear 124 and with a gear 130 fixed on the shaft of the resolver 134. When the hub member 34 turns about the axis 12, the gears 124, 128 and 130 are turned turning the shaft of the resolver 134 which provides signals to the control means indicating the angular position of the cylinders 18 and 26.

The illustrative parison transferring means is less bulky than conventional parison transferring means as it does not comprise a vertically-extending piston and cylinder assembly with rack.

I claim:

1. Parison transferring means for use in transferring glass parisons from a parison forming mould of a glassware container manufacturing machine to a further mould of the machine in which the parison is formed into a container, the transferring means comprising gripping means operative to grip a parison at a gripping position of the gripping means and to release the parison at a releasing position of the gripping means, and moving means operative to move the gripping means between its gripping and releasing positions by moving the gripping means about a horizontal axis of rotation, the moving means comprising a fixedly mounted shaft extending along the axis of rotation, a cylinder mounted on an end portion of the shaft for rotation about said axis, the gripping means being mounted on said cylinder, a piston movable in said cylinder by fluid under pressure introduced into the cylinder, the piston being connected to the cylinder by a driving connection which causes rotation of the cylinder about said axis when the piston rotates about said axis, and a piston rod fixed to said piston, there being a screw-threaded connection between the piston rod and the shaft such that, when the piston moves in the cylinder, the screw-threaded connection causes the piston to rotate about said axis thereby causing the cylinder and the gripping means to rotate about said axis.

2. Parison transferring means according to claim 1, wherein the cylinder is integral with a further cylinder mounted for rotation about said axis on an end portion of a further fixedly mounted shaft aligned with the aforementioned shaft, there being a further piston movable in said further cylinder by fluid under pressure introduced into said further cylinder, the further piston being connected to the further cylinder by a driving connection which causes rotation of the further cylinder about said axis when the further piston rotates about said axis, and a further piston rod fixed to the further piston, there being a screw-threaded connection between the further piston rod and the further shaft such that, when the further piston moves in the further cylinder, the screw-threaded connection causes the further piston to rotate about said axis thereby causing the further cylinder to rotate about said axis.

3. Parison transferring means according to either one of claims 1 and 2, wherein the or each driving connection is a screw-threaded connection of opposite hand to the associated screw-threaded connection between the piston rod and the shaft.

4. Parison transferring means according to either one of claims 1 and 2, wherein inlets/outlets for fluid under pressure to said cylinder, each extend through said shaft to an annular space formed between the cylinder and the shaft from which the inlet/outlet extends within the wall of the cylinder.

5. Parison transferring means according to either one of claims 1 and 2, wherein the or each cylinder is provided with ports for the exit of fluid therefrom which are arranged to be closed by the piston as it approaches the end of its stroke so that the end portion of the movement of the piston is cushioned.

6. Parison transferring means according to either one of claims 1 and 2, also comprising a feedback device driven by rotation of the cylinder and arranged to provide feedback of the position of the cylinder about the axis of rotation to control means operable to control supply of fluid under pressure to the cylinder.

* * * * *